US012771986B2

(12) United States Patent
Lin

(10) Patent No.: US 12,771,986 B2
(45) Date of Patent: Oct. 20, 2026

(54) SPEAKER MODULE AND SMART HEADSET

(71) Applicant: AAC ACOUSTIC TECHNOLOGIES (SHENZHEN) CO., LTD., Shenzhen (CN)

(72) Inventor: Meng Lin, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 197 days.

(21) Appl. No.: 18/637,361

(22) Filed: Apr. 16, 2024

(65) Prior Publication Data

US 2025/0159401 A1 May 15, 2025

Related U.S. Application Data

(63) Continuation of application No. PCT/CN2023/131268, filed on Nov. 13, 2023.

(51) Int. Cl.

*H04R 1/24* (2006.01)
*H04R 1/26* (2006.01)
*H04R 1/02* (2006.01)

(52) U.S. Cl.

CPC ................. *H04R 1/24* (2013.01); *H04R 1/26* (2013.01); *H04R 1/028* (2013.01)

(58) Field of Classification Search

CPC ............. H04R 1/24; H04R 1/26; H04R 1/028
USPC .......................................................... 381/182
See application file for complete search history.

(56) References Cited

U.S. PATENT DOCUMENTS 5,995,634 A * 11/1999 Zwolski ................. H04R 1/028 381/388
2004/0109576 A1* 6/2004 You ........................ H04R 5/033 381/335
2005/0207606 A1* 9/2005 Yang .................... H04R 1/1075 381/370
2011/0158440 A1* 6/2011 Mei ...................... H04R 1/1075 381/309
2021/0136313 A1* 5/2021 Li .......................... H04N 5/642

* cited by examiner

*Primary Examiner* — Suhan Ni
(74) *Attorney, Agent, or Firm* — Wiersch Law Group

(57) ABSTRACT

A speaker module and a smart headset are provided. The speaker module includes a speaker housing, a first sounding unit, and a second sounding unit. An accommodating cavity is defined in the speaker housing, the accommodating cavity includes a first space and a second space. The first sounding unit is fixed in the accommodating cavity, the first sounding unit divides the first space into a first rear sound cavity and a first front sound cavity. The second sounding unit is fixed in the accommodating cavity, the second sounding unit divides the second space into a second rear sound cavity and a second front sound cavity. The speaker provides a first speaker hole and a second speaker hole defined on the same surface of the speaker housing, which supplements and superposes sound of the speaker module and further improves an overall frequency range and loudness of the speaker.

9 Claims, 4 Drawing Sheets

SPEAKER MODULE AND SMART HEADSET

TECHNICAL FIELD

The present disclosure relates to the field of smart headset technology, and in particular to a speaker module and a smart headset.

BACKGROUND

A speaker of a headset product is mainly a single speaker, which generally includes a single sound production diaphragm and a main speaker hole and defines a balance hole on a rear cavity, sound is emitted from a vibrating diaphragm and passes through the main speaker hole to transmit to an external speaker, and finally reaches human ears.

In the prior art, as limited by performance of the single speaker, an ideal frequency range and enough loudness cannot be achieved at the same time, therefore, a low-frequency effect is generally limited and cannot meet a better low-frequency playback requirement in a practical application, such a structure depends on heavily replies on performance of the single speaker itself, so that an algorithm thereof is hardly optimized.

SUMMARY

The present disclosure aims to provide a speaker module and a smart headset to solve technical problems in the prior art, the speaker module improves an overall frequency range and loudness of a speaker.

In a first aspect, the present disclosure provides the speaker module, including a speaker housing, a first sounding unit, and a second sounding unit. An accommodating cavity is defined in the speaker housing, the accommodating cavity includes a first space and a second space. The first sounding unit is fixed in the accommodating cavity, the first sounding unit divides the first space into a first rear sound cavity and a first front sound cavity, a first speaker hole is defined on a first surface of the speaker housing, the first front sound cavity is communicated with an exterior of the speaker housing through the first speaker hole. The second sounding unit is fixed in the accommodating cavity, the second sounding unit divides the second space into a second rear sound cavity and a second front sound cavity, a second speaker hole is defined on the first surface of the speaker housing, and the second front sound cavity is communicated with the exterior of the speaker housing through the second speaker hole.

As an improvement, both the first speaker hole and the second speaker hole extend in a first direction, a projection of the first speaker hole in a second direction falls within the second speaker hole, the first direction is perpendicular to the second direction.

As an improvement, both the first speaker hole and the second speaker hole are rectangular structures or slotted structures.

As an improvement, at least one balance hole is defined on the speaker housing. The first rear sound cavity and the second rear sound cavity are communicated with the exterior of the speaker housing through the at least one balance hole, or, one of the first rear sound cavity and the second rear sound cavity is communicated with the exterior of the speaker housing through the at least one balance hole.

As an improvement, the speaker housing further includes a second surface, the second surface is disposed opposite to the first surface, and the at least one balance hole is defined on the second surface.

As an improvement, the first sounding unit is configured to receive a first frequency band signal, the second sounding unit is configured to receive a second frequency band signal, and a frequency of the first frequency band signal is different a frequency of the second frequency band signal.

As an improvement, the frequency of the first frequency band signal is greater than the frequency of the second frequency band signal.

As an improvement, the first rear sound cavity and the second rear sound cavity are combined into an integrated rear sound cavity.

As an improvement, the speaker housing includes a first sub-housing and a second sub-housing, the first sub-housing is covered with the second sub-housing, the first sounding unit is disposed in the first sub-housing, and the second sounding unit is disposed in the second sub-housing.

In a second aspect, the present disclosure provides the smart headset, including the speaker module as foregoing.

Compared with the prior art, the present disclosure provides the first speaker hole and the second speaker hole defined on the same surface of the speaker housing, which supplements and superposes sound of the speaker module and improves the overall frequency range and the loudness of the speaker at the same time, in particular to enhancing a playback effect of a low-frequency signal and achieving sound quality enhancement.

Figure 1:
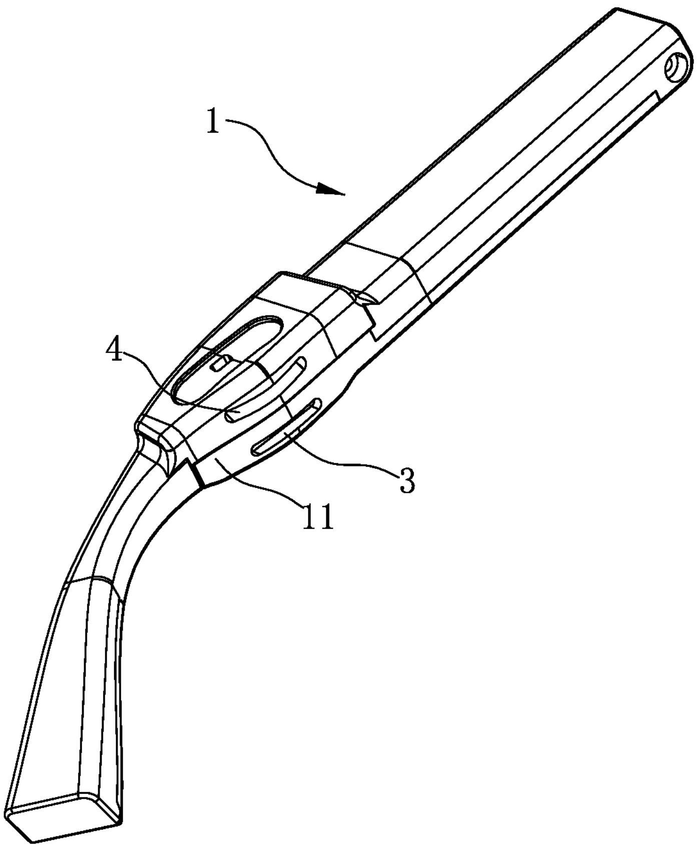
FIG. 1 is an isometric diagram of a first angle of an overall structure according to one embodiment of the present disclosure.

Reference numerals in the drawings: 1. speaker housing; 11. first surface; 12. second surface; 2. accommodating cavity; 21. first front sound cavity; 22. first rear sound cavity; 23. second front sound cavity; 24. second rear sound cavity; 25. first sounding unit; 26. second sounding unit; 3. first speaker hole; 4. second speaker hole; 5. balance hole; 6. first sub-housing; 7. second sub-housing; D1. first direction; D2. second direction.

DETAILED DESCRIPTION OF EMBODIMENTS

Embodiments described below with reference to accompanying drawings are exemplary and are only used to explain the present disclosure, but are not to be construed as limiting the present disclosure.

As shown in FIGS. 1-8, the embodiments of the present disclosure provide a speaker module, including a speaker housing 1, a first sounding unit 25, and a second sounding unit 26. An accommodating cavity 2 is defined in the speaker housing 1, the accommodating cavity 2 includes a first space and a second space. Those who skilled in the art may know that the first space and the second space may be spaces spaced in two physical meanings, both of the first space and the second space do not communicate with each other, or may be two areas defined by a person, the two areas are two different areas of an integrated space, and the two areas are communicated with each other.

The first sounding unit 25 is fixed in the accommodating cavity 2 and is disposed in the first space, the first sounding unit 25 divides the first space into a first rear sound cavity 22 and a first front sound cavity 21, a first speaker hole 3 is defined on a first surface 11 of the speaker housing 1, the first front sound cavity 21 is communicated with an exterior of the speaker housing 1 through the first speaker hole 3. The first sounding unit 25 is configured to vibrate to generate sound, in one embodiment, the first sounding unit 25 includes a diaphragm, a voice coil, a magnetic circuit unit, etc., under an action of the magnetic circuit unit, different ampere forces drive the voice coil having changeable current to vibrate to drive the diaphragm to vibrate, and the diaphragm vibrates to push surrounding air to vibrate, thereby generating the sound, and the first speaker hole 3 radiates sound waves of the first front sound cavity 21 to the outside.

The second sounding unit 26 is fixed in the accommodating cavity 2 and disposed in the second space, the second sounding unit 26 divides the second space into a second rear sound cavity 24 and a second front sound cavity 23, a second speaker hole 4 is defined on the first surface 11 of the speaker housing 1, and the second front sound cavity 23 is communicated with the exterior of the speaker housing 1 through the second speaker hole 4. The second sounding unit 26 is also configured to vibrate to generate the sound, and a sounding principle thereof is the same as a sounding principle of the first sounding unit 25, details of which are not described herein again.

Both the first speaker hole 3 and the second speaker hole 4 are defined on the same surface of the speaker housing 1, sound waves emitted by the first speaker hole 3 and the second speaker hole 4 are configured to supplement and superpose sound of the speaker module, meanwhile, the first sounding unit 25 and the second sounding unit 26 are driven by the same or different signals, which improves an overall frequency range and loudness of a speaker at the same time, and in particular to enhancing a playback effect of a low-frequency signal and achieving sound quality enhancement.

Figure 3:
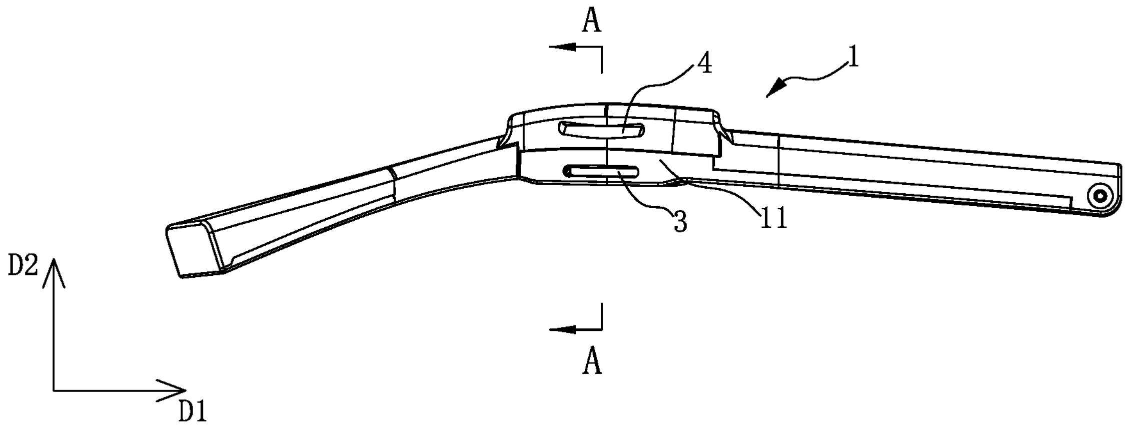
FIG. 3 is a schematic diagram of a front view of the overall structure according to one embodiment of the present disclosure.
Figure 5:
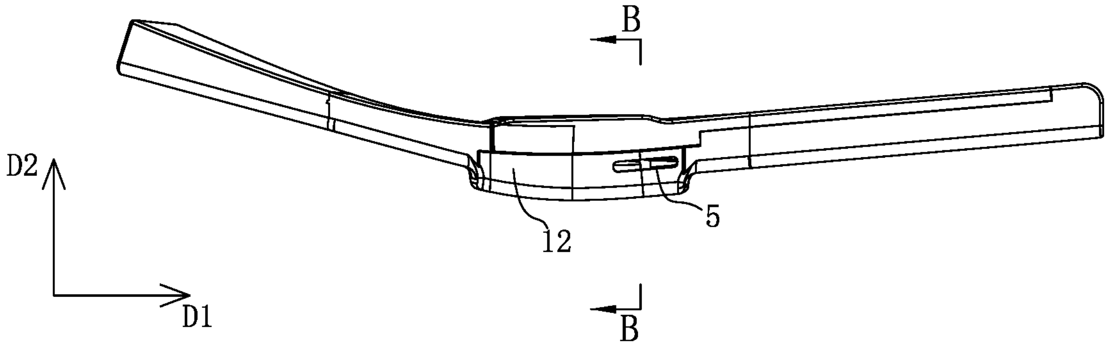
FIG. 5 is a schematic diagram of a rear view of the overall structure according to one embodiment of the present disclosure.

As an improvement, as shown in FIGS. 3 and 5, both the first speaker hole 3 and the second speaker hole 4 extend in a first direction D1, and the first speaker hole 3 is parallel to the second speaker hole 4, a preset distance is defined between the first speaker hole 3 and the second speaker hole 4, and the preset distance is determined according to actual sound quality adjustment requirements, so as to achieve a good sound wave superposition effect, which is not limited herein.

In one embodiment, as shown in FIG. 3, a length of the first speaker hole 3 is less than a length of the second speaker hole 4, a projection of the first speaker hole 3 in a second direction D2 falls within the second speaker hole 4, the first direction D1 is perpendicular to the second direction D2, which effectively gradually radiates emitted sound waves and reflected sound waves, thereby further improving a sound wave superposition effect. Those who skilled in the art may know that the length of the first speaker hole 3 may also be the same as the length of the second speaker hole 4, the projection of the first speaker hole 3 in the second direction D 2 is overlapped with the second speaker hole 4, and the first speaker hole 3 and the second speaker hole 4 are arranged side by side.

As shown in FIGS. 1 and 3, both the first speaker hole and the second speaker hole are rectangular structures or slotted structures, a first length of the first speaker hole and a first length of the second speaker hole in the first direction D1 is much greater than a second length of the first speaker hole and a second length of the second speaker hole in the second direction D2, thereby reducing energy of the reflected sound waves, meanwhile, the first speaker hole 3 or the second speaker hole 4 being flat-shaped gradually radiate most or all of the reflected sound waves to the outside, so that standing wave interference an interior of the first front sound cavity 21 or an interior of the second front sound cavity 23 are avoided from standing wave interference to a great extent, a fluctuation range of a frequency response curve of the speaker module in a full frequency band is reduced, and acoustic performance of the speaker module is improved.

Figure 2:
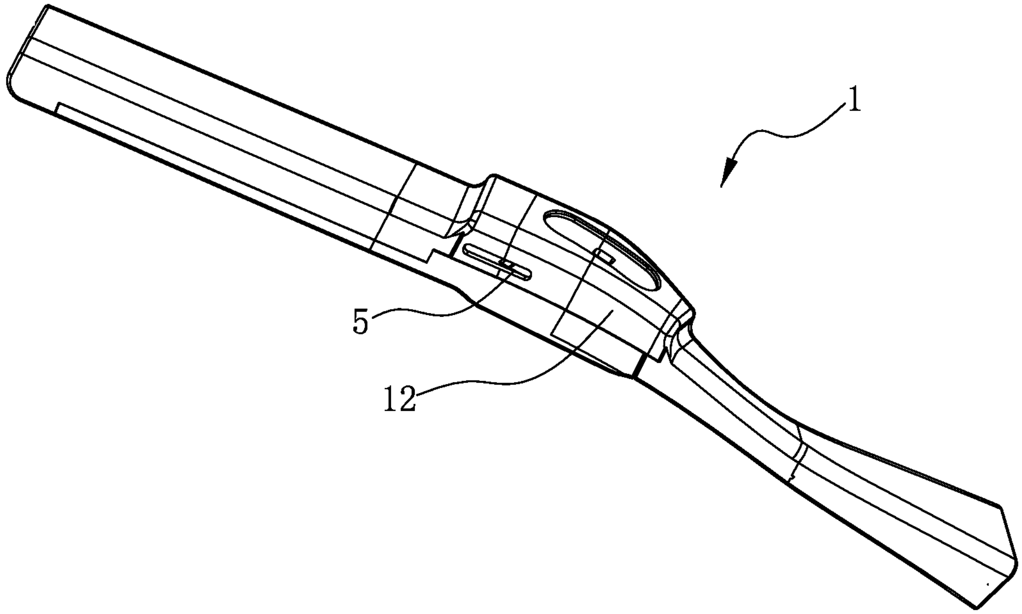
FIG. 2 is an isometric schematic diagram of a second angle of the overall structure according to one embodiment of the present disclosure.

In one embodiment, as shown in FIG. 2, at least one balance hole 5 is defined on the speaker housing 1, the at least one balance hole 5 is a rectangular structure or a slotted structure and is also flat-shaped. The first rear sound cavity 22 and the second rear sound cavity 24 are communicated with the exterior of the speaker housing 1 through the at least one balance hole 4, or, one of the first rear sound cavity 22 and the second rear sound cavity 24 is communicated with the exterior of the speaker housing 1 through the at least one balance hole 4, the at least one balance hole 5 cooperates with the first speaker hole 3 and/or the second speaker hole 4 to reduce sound leakage thereof using a dipole effect, thereby improving privacy of the speaker module. The dipole effect may be understood and implemented by those who skilled in the art, and details are not described in detail in the present disclosure.

In one embodiment, the first rear sound cavity 22 of the first sounding unit 25 is separated from the second rear sound cavity 24 of the second sounding unit 26, the first rear sound cavity 22 and the second rear sound cavity 24 are not communicated with each other, two balance holes 5 are defined on the loudspeaker housing 1 respectively corresponding to the first rear sound cavity 22 and the second rear sound cavity 24.

Figure 4:
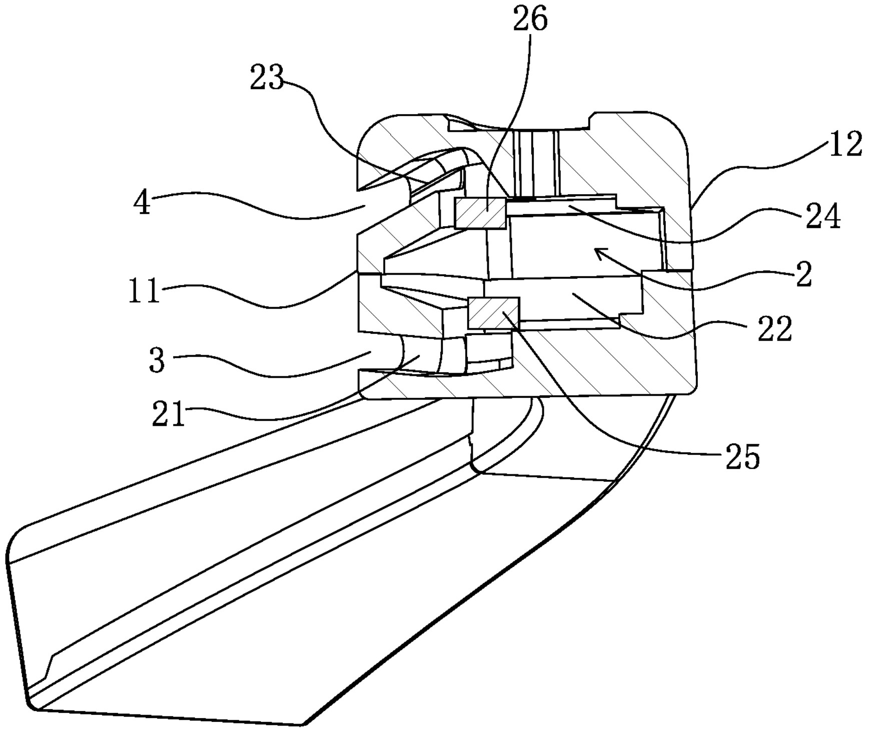
FIG. 4 is a cross-sectional schematic diagram taken along line A-A shown in FIG. 3.
Figure 6:
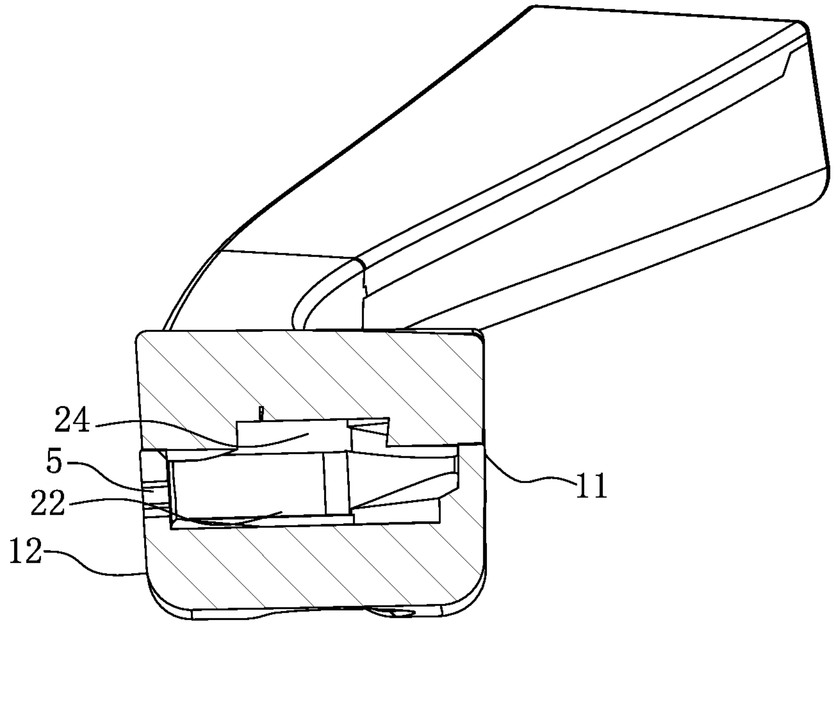
FIG. 6 is a cross-sectional schematic diagram taken along line B-B shown in FIG. 5.

In one embodiment, as shown in FIGS. 4 and 6, the first space and the second space enclose an integrated space, the first space and the second space are communicated with each other, the first rear sound cavity 22 and the second rear sound cavity 24 are combined into an integrated rear sound cavity, the first sounding unit 25 and the second sounding unit 26 share one rear sound cavity, and meanwhile, only one balance hole 5 is provided, thereby simplifying corresponding structure.

As an improvement, the speaker housing 1 further includes a second surface 12, the second surface 12 is disposed opposite to the first surface 11, the first surface 11 and the second surface 12 extend in the same direction, the at least one balance hole 5 is defined on the second surface 12, that is, a surface where the at least one balance hole 5 is defined is opposite to a surface where the first speaker hole 3 and the second speaker hole 4 are defined. As shown in FIGS. 1, 2, 4, and 6, a shape of the at least one balance hole 5 is matched with shapes of the first speaker hole 3 and the second speaker hole 4, a position of the at least one balance hole 5 on the second surface 12 is staggered with or only partially overlapped with projection positions of the first speaker hole 3 and the second speaker hole 4 on the second surface 12, sound waves generated by the first sounding unit 25 and sound waves generated by the second sounding unit 26 are superposed and form the dipole effect with the sound leakage generated by the at least one balance hole 5 to cancel each other, thereby further reducing the sound leakage of the at least one balance hole 5 to improve the privacy of the speaker module.

In one embodiment, the first sounding unit 25 and the second sounding unit 26 are designed to have different performances, for example, the first sounding unit 25 and the second sounding unit 26 have different frequency ranges, and the first sounding unit 25 and the second sounding unit 26 are matched with each other to expand an overall frequency range. Specifically, the first sounding unit 25 is configured to receive a first frequency band signal, the second sounding unit 26 is configured to receive a second frequency band signal, and a frequency of the first frequency band signal is different a frequency of the second frequency band signal, so that sound wave interaction of different combinations is achieved, a larger operation space is provided for an active algorithm, and a richer acoustic experience is further provided.

In one embodiment, the frequency of the first frequency band signal is greater than the frequency of the second frequency band signal. The first frequency band signal is a medium-high frequency signal, the second frequency band signal is a medium-low frequency signal, the first sounding unit 25 is a medium-high frequency speaker, and the second sounding unit 26 is a medium-low frequency speaker, thereby improving high-frequency reproduction of the speaker module and reducing intermodulation distortion of the speaker module, meanwhile, an ideal frequency range and sufficient loudness of the speaker is achieved, and a better low-frequency playback requirement in a practical application is met.

Figure 7:
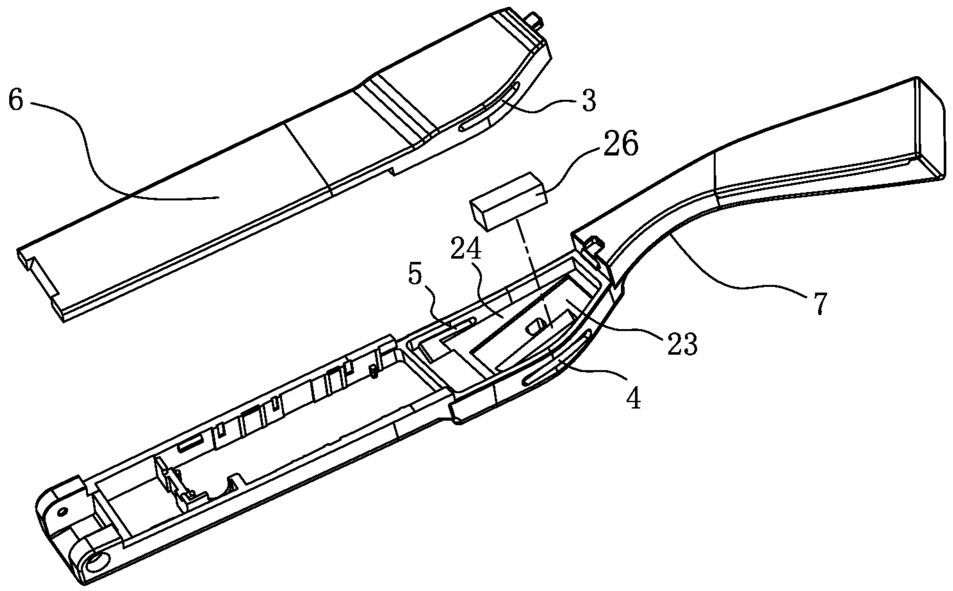
FIG. 7 is an exploded structural schematic diagram of a third angle of the overall structure according to one embodiment of the present disclosure.
Figure 8:
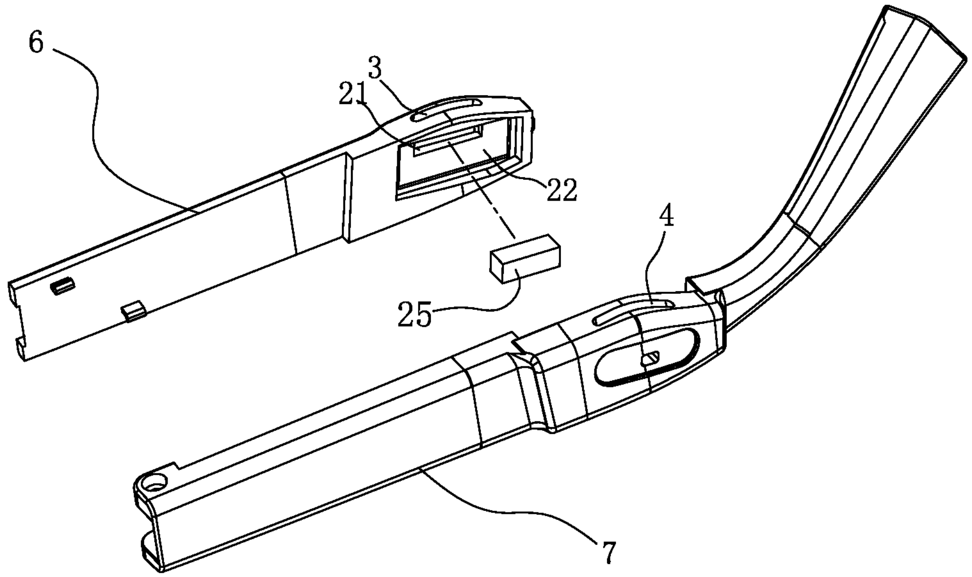
FIG. 8 is an exploded structural schematic diagram of a fourth angle of the overall structure according to one embodiment of the present disclosure.

In one embodiment, as shown in FIGS. 7-8, the speaker housing 1 includes a first sub-housing 6 and a second sub-housing 7, the first sub-housing 6 is covered with the second sub-housing 7, the first sub-housing 6 and the second sub-housing 7 are fastened and connected by a snap-fit member, and a structure of the snap-fit member may refer to technical solutions in the prior art, which is not repeated here, and in practical applications, the speaker housing 1 may also be of other structures, for example, the speaker housing is formed by combining more housings, or is integrally formed, which is not limited herein.

The first sounding unit 25 is disposed in the first sub-housing 6, the first speaker hole 3 is also defined on the first sub-housing 6, the second sounding unit 26 is disposed in the second sub-housing 7, and the second speaker hole 4 is also defined on the second sub-housing 7, so that the first sounding unit 25 and the second sounding unit 26 are easy to assemble into the speaker housing 1, and are further convenient to disassemble and maintain, thereby meeting a requirement of mass production.

Based on above embodiments, the present disclosure further provides a smart headset, such as smart glasses, a head-mounted display (HMD), etc. Specifically, Smart wearables include an augmented reality (AR) device, a virtual reality (VR) device, and a mix reality (MR) device.

The smart headset includes at least one speaker module, the at least one speaker module is the speaker module as foregoing. For example, AR glasses include a glasses frame and two glasses legs connected to two opposite ends of the glasses frame, two speaker modules are provided, and the two speaker modules are respectively arranged at symmetrical positions of the two glasses legs.

Based on the embodiments of the present disclosure, the speaker module of the present disclosure provides the first speaker hole 3 and the second speaker hole 4 defined on the same surface of the speaker housing 1, which supplements and superposes sound of the speaker module and improves the overall frequency range and the loudness of the speaker at the same time, in particular to enhancing the playback effect of the low-frequency signal and achieving the sound quality enhancement.

Structures, features, and effects of the present disclosure are described in detail above according to the embodiments shown in the drawings, but the above are only preferred embodiments of the present disclosure, and the present disclosure is not limited to an implementation scope shown in the drawings, and any changes made according to a concept of the present disclosure or equivalent embodiments modified to equivalent changes still fall within a protection scope of the present disclosure without departing from a spirit covered by the specification and the drawings of the present disclosure.

What is claimed is:

1. A speaker module, comprising:
- a speaker housing;
- a first sounding unit; and
- a second sounding unit;
- wherein an accommodating cavity is defined in the speaker housing, the accommodating cavity comprises a first space and a second space;
- the first sounding unit is fixed in the accommodating cavity, the first sounding unit divides the first space into a first rear sound cavity and a first front sound cavity, a first speaker hole is defined on a first surface of the speaker housing, the first front sound cavity is communicated with an exterior of the speaker housing through the first speaker hole; and
- the second sounding unit is fixed in the accommodating cavity, the second sounding unit divides the second space into a second rear sound cavity and a second front sound cavity, a second speaker hole is defined on the first surface of the speaker housing, and the second front sound cavity is communicated with the exterior of the speaker housing through the second speaker hole;
- wherein each of the first speaker hole and the second speaker hole is an elongated opening that extends in a first direction on the first surface; for each of the first speaker bole and the second speaker hole, a length thereof along the first direction is greater than a length thereof along a second direction perpendicular to the first direction; and a projection of the first speaker hole in the second direction falls within the second speaker hole.

2. The speaker module according to claim 1, wherein both the first speaker hole and the second speaker hole are rectangular structures or slotted structures.

3. The speaker module according to claim 1, wherein at least one balance hole is defined on the speaker housing; the first rear sound cavity and the second rear sound cavity are communicated with the exterior of the speaker housing through the at least one balance hole, or, one of the first rear sound cavity and the second rear sound cavity is communicated with the exterior of the speaker housing through the at least one balance hole.

4. The speaker module according to claim 3, wherein the speaker housing further comprises a second surface, the second surface is disposed opposite to the first surface, and the at least one balance hole is defined on the second surface.

5. The speaker module according to claim 1, wherein the first sounding unit is configured to receive a first frequency band signal, the second sounding unit is configured to receive a second frequency band signal, and a frequency of the first frequency band signal is different a frequency of the second frequency band signal.

6. The speaker module according to claim 5, wherein the frequency of the first frequency band signal is greater than the frequency of the second frequency band signal.

7. The speaker module according to claim 1, wherein the first rear sound cavity and the second rear sound cavity are combined into an integrated rear sound cavity.

8. The speaker module according to claim 1, wherein the speaker housing comprises a first sub-housing and a second sub-housing, the first sub-housing is covered with the second sub-housing, the first sounding unit is disposed in the first sub-housing, and the second sounding unit is disposed in the second sub-housing.

9. A smart headset, comprising: the speaker module according to claim 1.

* * * * *